United States Patent
Maruyama et al.

(10) Patent No.: US 9,825,307 B2
(45) Date of Patent: Nov. 21, 2017

(54) ANODE-SIDE CATALYST COMPOSITION FOR FUEL CELLS, AND MEMBRANE ELECTRODE ASSEMBLY (MEA) FOR SOLID POLYMER FUEL CELLS WHICH COMPRISES SAME

(75) Inventors: Masashi Maruyama, Tokyo (JP);
Atsushi Sakamoto, Tokyo (JP);
Tomoyuki Kawaguchi, Tokyo (JP);
Takuya Kosaka, Tokyo (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 355 days.

(21) Appl. No.: 13/822,771

(22) PCT Filed: Oct. 26, 2011

(86) PCT No.: PCT/JP2011/074729
§ 371 (c)(1),
(2), (4) Date: May 17, 2013

(87) PCT Pub. No.: WO2012/057236
PCT Pub. Date: May 3, 2012

(65) Prior Publication Data
US 2013/0224522 A1    Aug. 29, 2013

(30) Foreign Application Priority Data
Oct. 26, 2010   (JP) .................... 2010-239433

(51) Int. Cl.
| H01M 4/90 | (2006.01) |
|---|---|
| H01M 4/92 | (2006.01) |
| H01M 4/86 | (2006.01) |
| H01M 8/1007 | (2016.01) |
| H01M 8/1018 | (2016.01) |

(52) U.S. Cl.
CPC .......... *H01M 4/9041* (2013.01); *H01M 4/86* (2013.01); *H01M 4/8652* (2013.01); *H01M 4/9075* (2013.01); *H01M 4/9083* (2013.01); *H01M 4/921* (2013.01); *H01M 4/925* (2013.01); *H01M 4/926* (2013.01); *H01M 8/1007* (2016.02); *H01M 4/8668* (2013.01); *H01M 2004/8684* (2013.01); *H01M 2008/1095* (2013.01)

(58) Field of Classification Search
CPC ....................................................... H01M 4/90
USPC .................................................. 429/525-528
See application file for complete search history.

(56) References Cited

U.S. PATENT DOCUMENTS

| 2,177,412 | A | * | 10/1939 | Scott | ........................ B22F 9/18 |
|---|---|---|---|---|---|
| | | | | | 252/188.1 |
| 3,658,595 | A | * | 4/1972 | Batzold | .................. H01M 4/92 |
| | | | | | 429/506 |
| 6,197,147 | B1 | * | 3/2001 | Bonsel | ..................... C25B 9/10 |
| | | | | | 156/269 |
| 6,855,453 | B2 | | 2/2005 | Bett et al. | |
| 2002/0107140 | A1 | * | 8/2002 | Hampden-Smith et al. | . 502/185 |
| 2007/0026292 | A1 | | 2/2007 | Adzic et al. | |

FOREIGN PATENT DOCUMENTS

| EP | 2 360 760 A1 | 7/2010 |
|---|---|---|
| JP | 2001-357857 | 12/2001 |
| JP | 2004-22503 | 1/2004 |
| JP | 2005-270687 | 10/2005 |
| JP | 2008-41411 | 2/2008 |
| WO | WO 01/15247 | 3/2001 |

OTHER PUBLICATIONS

International Search Report PCT/JP2011/074729 dated Nov. 22, 2011.

* cited by examiner

Primary Examiner — James Lee
(74) Attorney, Agent, or Firm — Kilpatrick Townsend & Stockton, LLP

(57) ABSTRACT

A technology is provided that is capable of improving deterioration of a fuel cell due to non-stationary operation (startup/shutdown, fuel depletion).

An anode-side catalyst composition comprising a catalyst having catalyst particles carried on electrically conductive material and an ion exchange resin, characterized in that the catalyst particle are formed of an alloy, of which oxygen reduction capability and water electrolysis are both lower than those of platinum, and which has hydrogen oxidation capability.

3 Claims, No Drawings

ANODE-SIDE CATALYST COMPOSITION FOR FUEL CELLS, AND MEMBRANE ELECTRODE ASSEMBLY (MEA) FOR SOLID POLYMER FUEL CELLS WHICH COMPRISES SAME

FIELD OF THE INVENTION

The present invention relates to an anode-side catalyst composition for a fuel cell and a membrane electrode assembly comprising the same for a solid polymer-type fuel cell.

BACKGROUND ART

In recent years, a fuel cell has been attracting increasing attention as a highly efficient energy conversion apparatus. Fuel cells can be broadly divided by the type of electrolyte used, into low temperature operating fuel cells such as an alkaline-type, a solid polymer-type, a phosphoric acid-type, etc., and high temperature operating fuel cells such as a molten carbonate-type, solid oxide type, etc. Among them, a polymer electrolyte fuel cell (PEFC) which uses a polymer electrolyte membrane having ionic conductivity as an electrolyte attracts attention as a stationary power source, vehicle mounted power source, and mobile phone power source since it has a compact structure and provides high power output density and does not use a liquid electrolyte and can be operated at low temperature so that it can be realized as a simple system.

A solid polymer electrolyte fuel cell has gas diffusive electrode layers disposed on both surfaces of an electrolyte membrane with an anode-side exposed to fuel gas (hydrogen gas or the like) and a cathode-side exposed to oxidant gas (air or the like), and is based on the basic principle that water is produced by chemical reaction via the polymer electrolyte membrane such that the reaction energy produced in this reaction can be extracted as electric energy.

When hydrogen and oxygen are supplied to an anode and cathode, respectively, as an active material, reaction (1) takes place on the anode catalyst and reaction (2) takes place on the cathode catalyst and electric power is generated by the electric potential difference.

$$H_2 \rightarrow 2H^+ + 2e^- \quad (E_0 = 0 \text{ V}) \tag{1}$$

$$O_2 + 4H^+ + 4e^- \rightarrow 2H_2O \quad (E_0 = 1.23 \text{ V}) \tag{2}$$

Since a fuel cell system has highly efficient power generation characteristics, it is now being developed for practical application, and durability for practical application has been achieved in stationary operations. However, since platinum is used as the electrode catalyst, the system is expensive, and it has also become evident that, in non-stationary operations such as during fuel depletion or startup/shutdown operation, irreversible deterioration of the system is accelerated. These problems need to be overcome for practical application of a fuel cell.

Mechanism of anode deterioration caused by depletion of fuel (hydrogen gas or the like) supplied during operation of a fuel cell will be described below. When the fuel is depleted, one or both of the reaction (3) in which water is decomposed in electrolysis to produce $H^+$, and the reaction (4) in which carbon that carries an anode catalyst reacts in corrosion to produce $H^+$, takes place in order to supplement $H^+$ that is required for cell reaction, and causes considerable deterioration of the anode.

$$H_2O \rightarrow \tfrac{1}{2}O_2 + 2H^+ + 2e^- \tag{3}$$

$$\tfrac{1}{2}C + H_2O \rightarrow \tfrac{1}{2}CO_2 + 2H^+ + 2e^- \tag{4}$$

In particular, deterioration of anode due to reaction (4) is serious and may lead to instantaneous breakage of the fuel cell. Especially when reaction efficiency of electrolysis of water is poor (that is, reaction overvoltage is high), the reaction (4) in which $H^+$ is produced by corrosion of carbon as the catalyst carrier is more likely to take place than the water electrolysis reaction (3), leading to large deterioration of anode.

Mechanism of cathode corrosion due to startup/shutdown operation will be described below. In a stationary operation of a fuel cell, there is a hydrogen atmosphere on the anode side and air atmosphere on the cathode side. In startup/shutdown operation, in general, air is supplied to the anode side to stop generation of electricity. In a state of operation stop, usually there is air surrounding both the anode side and the cathode side, and in order to start generation of electricity (startup), hydrogen gas is supplied to the anode in the air atmosphere. When hydrogen gas is supplied to the anode at the time of startup, a mixture of hydrogen and air may possibly be present on the anode side.

$$H_2 \rightarrow 2H^+ + 2e^- \tag{1}$$

$$O_2 + 4H^+ + 4e^- \rightarrow 2H_2O \tag{2}$$

$$\tfrac{1}{2}C + H_2O \rightarrow \tfrac{1}{2}CO_2 + 2H^+ + 2e^- \tag{4}$$

Thus, at the time of startup of operation, on the portion of the anode near the inlet port for anode gas where hydrogen gas is being supplied, the hydrogen oxidation reaction (1) takes place, and on the portion of the opposite cathode in position opposed to the anode gas inlet port where air (oxygen) is already present, oxygen reduction reaction (2) takes place, so that, on the upstream portion of the anode and the cathode, a reaction system of ordinary fuel cell takes place. On the other hand, on the portion of the anode near the anode gas outlet port where air (oxygen) supplied during the operation stop remains and hydrogen is not yet supplied, oxygen reduction reaction (2) takes place. On the portion of the opposite cathode in position opposed to the anode gas outlet port, corresponding oxidation reaction takes place. However, since no hydrogen is present to be oxidized, corrosion reaction (4) takes place to oxidize the carbon. Thus, on the portion of the cathode opposed to the downstream portion of the anode, a reaction system of carbon corrosion takes place, and this is reported to be one of the causes of cathode deterioration during startup/shutdown operation (Patent Literature 1).

In Patent literature 2, as a means for preventing deterioration during the fuel depletion, a method is disclosed in which a water electrolysis catalyst such as iridium oxide is mixed with the electrode catalyst in order to prevent the anode catalyst carrier from being corroded during hydrogen depletion. In accordance with this method, a fuel cell can be made more tolerant to cell reversal.

In Patent Literature 3, in a fuel electrode of a solid polymer electrolyte type fuel cell, a method relating to a fuel electrode (anode) of solid electrolyte fuel cell is disclosed which comprises at least one reaction layer accelerating the reaction of the fuel cell in contact with the solid polymer electrolyte membrane and at least one water decomposition layer in contact with the diffusion layer for electrolysis of water within the fuel electrode (anode). It is reported that, in accordance with this method, a solid polymer electrolyte type fuel cell can be provided in which deterioration of electrode is unlikely to be produced even when lack of fuel occurs in the fuel electrode.

Also, as a means for preventing deterioration during the startup/shutdown operation, adoption of highly crystallized carbon as a carrier of the cathode catalyst is exemplified, and an example of platinum black usage have been disclosed (Patent Literatures 4, 5).

Impurities such as $CH_4$, $C_2H_6$, $C_2H_4C_6H_6CO_2$, CO, and the like may be contained in the fuel gas. Among these impurities contained in the fuel gas, CO is known to be specifically adsorbed to Pt, and cause degradation of performance. This makes it difficult to reduce consumption of the anode catalyst.

CITATION LIST

Patent Literature

Patent Literature 1: U.S. Pat. No. 6,855,453
Patent Literature 2: Japanese Unexamined Patent Application Publication (Translation of PCT Application) No. 2003-508877
Patent Literature 3: Japanese Published Unexamined Patent Application No. 2004-22503
Patent Literature 4: Japanese Published Unexamined Patent Application No. 2001-357857
Patent Literature 5: Japanese Published Unexamined Patent Application No. 2005-270687

SUMMARY OF THE INVENTION

Problems to be Solved by the Invention

For practical application of fuel cells, it is both indispensable to suppress deterioration of fuel cells during non-stationary operation (startup/shutdown operation, fuel depletion) and to reduce cost by decreasing the amount of platinum catalyst usage. Solution of only one of these problems is insufficient for practical application of fuel cells.

Prior art technologies for suppressing deterioration of fuel cells due to non-stationary operation (startup/shutdown operation, fuel depletion) have been known. However, use of platinum (Pt) catalyst is presupposed in any of these prior art technologies. Since platinum (Pt) accounts for most of the cost of fuel cells, these prior art methods are insufficient and there remains a problem of cost for practical application of fuel cells.

As a countermeasure to fuel depletion, it has been proposed in prior art technologies to use water decomposition catalysts. However, these water decomposition catalysts are easily soluble and it is difficult to compose a fuel cell only with water decomposition catalysts. Therefore, it is not developed for practical application, and is only used as additives to platinum (Pt) catalyst.

A countermeasure to deterioration due to startup/shutdown operation has also been proposed by prior art technologies, although further improvement is required. Since there is a trade-off between improvement in tolerance to startup/shutdown operation and sufficient initial power output, it is necessary to increase the amount of carried cathode catalyst in order to obtain practical power output at the expense of high cost. As a result, it is difficult to attain both high tolerance to startup/shutdown operation and cost reduction.

Since prior art technologies are insufficient countermeasure to startup/shutdown operation and fuel depletion, protection of a fuel cell as a system is being attempted. Thus, various sensors are used to closely monitor gas pressure, electrical potential, and the like to thereby control them so as not to induce deterioration mode caused by startup/shutdown operation or fuel depletion. Cost of these auxiliary apparatus and complicated control make it difficult to reduce cost of fuel cell with protection by using a system.

In view of resolution of these problems, there is still a need of a technology that is of low cost and is capable of improving deterioration of fuel cell due to non-stationary operation (startup/shutdown operation, fuel depletion).

Means for Solving the Problems

In accordance with the present invention, (1) there is provided a catalyst composition for anode-side catalyst of a fuel cell comprising a catalyst with catalyst particles carried on electrically conductive material, and an ion exchange resin, characterized in that the catalyst particle is formed of an alloy, of which oxygen reduction capability and water electrolysis overvoltage are both lower than those of platinum and which has hydrogen oxidizing capability.

Also, in accordance with the present invention, (2) there is provided a catalyst composition as described in (1), wherein the alloy comprises a metal selected from a group consisting of iridium, ruthenium, gold, palladium, cobalt, nickel, and silver.

Also, in accordance with the present invention, (3) there is provided a catalyst composition as described in (2), wherein the alloy comprises a metal selected from a group consisting of iridium and palladium.

Also, in accordance with the present invention, (4) there is provided a catalyst composition as described in (3), wherein the alloy comprises a first metal selected from a group consisting of iridium and palladium, and a second metal that can be alloyed with the first metal, wherein the second metal that can be alloyed with iridium is selected from a group consisting of cobalt, molybdenum, niobium, osmium, rhenium, ruthenium, tantalum, titanium, tungsten, vanadium, and zirconium, and the second metal that can be alloyed with palladium is selected from a group consisting of silver, aluminum, gold, cobalt, chromium, copper, iron, indium, manganese, molybdenum; nickel, osmium, lead, rhodium, ruthenium, tin, titanium, uranium, vanadium, tungsten and zirconium.

Also, in accordance with the present invention, (5) there is provided a catalyst composition as described in (4), wherein the alloy comprises iridium as the first metal and ruthenium as the second metal.

Also, in accordance with the present invention, (6) there is provided a catalyst composition as described in (4) or (5), wherein mass ratio of the first metal and the second metal in said alloy is in the range of 8:2~1:9.

Also, in accordance with the present invention, (7) there is provided a catalyst composition as described in any one of (1)~(6), wherein the electrically conductive material is carbon black of high degree of graphitization, and having BET specific surface area of not smaller than 50 $m^2/g$ and not larger than 300 $m^2/g$.

Also, in accordance with the present invention, (8) there is provided a membrane electrode assembly (MEA) for a polymer electrolyte fuel cell having anode catalyst layer joined to one surface of a polymer electrolyte membrane and a cathode catalyst layer to the opposite surface thereof, wherein the anode catalyst layer comprises the catalyst composition as described in any one of (1)~(7).

Also, in accordance with the present invention, (9) there is provided an MEA as described in (8), wherein the amount of Pt carried on the cathode is not more than 0.2 $mg/cm^2$.

Effect of the Invention

In accordance with the present invention, a fuel cell of low cost and high performance can be obtained which is capable of suppressing deterioration of the fuel cell due to non-stationary operation (startup/shutdown operation, fuel depletion), and in which platinum (Pt) that accounts for most of the cost of a fuel cell in prior art needs not be used in the anode.

In accordance with the present invention, even when hydrogen supplied during operation of a fuel cell is depleted, the problem of elution of catalyst can be avoided, and it is possible to prevent deterioration of anode without using platinum catalyst.

Also, in accordance with the present invention, it becomes possible to reduce deterioration of the anode and the cathode at the time of startup/shutdown operation of a fuel cell. Because of this effect, durability of the cathode can be greatly improved, and amount of platinum catalyst carried on the cathode can be reduced, so that an inexpensive fuel cell of low cost can be obtained.

In accordance with the present invention, main causes of deterioration of a fuel cell such as fuel depletion (pole reversal) and startup/shutdown operation can be fundamentally resolved. Therefore, portions of a fuel cell which are protected by conventional system can be decreased, leading to cost reduction of the entire system.

In accordance with the present invention, a catalyst having high tolerance to CO poisoning is provided. Conventionally, a catalyst is provided in an amount taking account of CO poisoning. With the present invention, excess amount of catalyst can be dispensed with, so that the amount of catalyst used can be reduced, leading to improved tolerance to startup/shutdown operation and to cost reduction.

BEST MODE FOR CARRYING OUT THE INVENTION

The catalyst composition according to the present invention is an anode-side catalyst composition for fuel cell comprising a catalyst with catalyst particles carried on an electrically conductive material and an ion exchange resin, characterized in that the catalyst particle is formed of an alloy, of which oxygen reduction capability and water electrolysis overvoltage are both lower than those of platinum, and which has hydrogen oxidation capability.

A fuel cell has the basic structure of a polymer electrolyte membrane with catalyst layers disposed and joined to both sides thereof. One of the catalyst layers is the anode that reacts with the fuel (hydrogen or the like). The other catalyst layer is the cathode that reacts with the oxidant gas (oxygen or the like). When hydrogen and oxygen are supplied to respective catalyst layers as active material, reaction [1] takes place on the anode catalyst, and reaction [2] takes place on the cathode catalyst, and electricity is generated by the electrical potential difference.

$$H_2 \rightarrow 2H^+ + 2e^- \quad (E_0 = 0 \text{ V}) \tag{1}$$

$$O_2 + 4H^+ + 4e^- \rightarrow 2H_2O \quad (E_0 = 1.23 \text{ V}) \tag{2}$$

The catalyst particle contained in the catalyst composition of the present invention has hydrogen oxidation capability, i.e., ability for promoting the above reaction [1]. With this capability, the catalyst composition containing the catalyst particles acts as the anode-side catalyst composition for a fuel cell.

The catalyst particle has water electrolysis overvoltage that is lower than that of platinum. Water electrolysis overvoltage means, in the following reaction [3], the difference between the theoretical electrical potential of the reaction obtained from thermodynamics of the reaction and actual electrode potential when the reaction actually proceeds. Thus, when this catalyst particle is used, the reaction [3] proceeds with potential difference lower than when platinum is used as a catalyst.

$$H_2O \rightarrow \tfrac{1}{2}O_2 + 2H^+ + 2e^- \tag{3}$$

As a result, deterioration of the anode at the time of fuel depletion can be suppressed.

When fuel is depleted on the anode, the reaction [1] does not take place, and one or both of the reaction [3] in which water is decomposed in electrolysis to produce $H^+$ and the reaction [4] in which carbon that carries anode catalyst reacts in corrosion to produce $H^+$ takes place in order to supplement $H^+$ that is required for cell reaction.

$$\tfrac{1}{2}C + H_2O \rightarrow \tfrac{1}{2}CO_2 + 2H^+ + 2e^- \tag{4}$$

If the reaction efficiency of the water electrolysis reaction [3] is low (the reaction overvoltage is high), the reaction [4] in which carbon that carries the catalyst is corroded to produce $H^+$ is more likely to occur than the reaction [3], leading to larger deterioration of the anode.

In the present invention in which a catalyst whose oxygen generation overvoltage is lower than that of platinum is used, increase of anode electrical potential at the time of fuel depletion can be suppressed. Thus, water electrolysis reaction [3] that takes place at the time of fuel depletion is promoted smoothly, and the reaction [4] in which the anode (or the carbon that carries catalyst contained therein) is corroded to produce H' is unlikely to occur. As a result, deterioration of the anode during fuel depletion can be suppressed.

The catalyst particle has oxygen reduction capability lower than that of platinum. Oxygen reduction capability means the capability to promote the following reaction [2].

$$O_2 + 4H^+ + 4e^- \rightarrow 2H_2O \tag{2}$$

Since oxygen reduction capability of the anode catalyst of the present invention is lower than that of platinum, deterioration of fuel cell at the time of startup/shutdown operation can be suppressed.

Mechanism of deterioration of fuel cell during startup/shutdown operation is as follows. On the anode, oxygen reduction reaction [2] takes place, and corresponding oxidation reaction takes place on the opposing cathode. However, since fuel (hydrogen or the like) to be oxidized is not supplied to the cathode, corrosion reaction [4] in which carbon existing as the electrode material is corroded takes place on the cathode.

$$\tfrac{1}{2}C + H_2O \rightarrow \tfrac{1}{2}CO_2 + 2H^+ + 2e^- \tag{4}$$

In the present invention, a catalyst having low oxygen reduction activity is used on the anode to suppress oxygen reduction reaction [2] on the anode, so that induction of the cathode corrosion reaction [4] on the cathode can be suppressed, and deterioration of the fuel cell can be thereby suppressed.

The catalyst particle of the present invention is formed from an alloy that has above-described properties. Thus, the catalyst particle of the present invention is formed from an alloy, of which oxygen reduction capability and water electrolysis overvoltage are both lower than those of platinum, and which has hydrogen oxidation capability. An element metal having equivalent properties, for example iridium, is known, but has a problem of elution during the operation of the fuel cell, and has also a problem of long term durability. The present inventor has found that elution can be suppressed by alloying, and has arrived at the present invention.

Alloys suitable for various applications are being used since properties (such as melting point, magnetic property, mechanical strength, corrosion resistance, catalytic activity, etc.) of a single element metal can be greatly modified by adding other metal element. In the present examination too, elusivity can be lowered by alloying, and long term stability can be expected.

Metal elements included in the alloy contained in the anode-side catalyst composition of the present invention may be selected from a group consisting of iridium, ruthenium, gold, palladium, cobalt, nickel, and silver. An alloy comprising these metal elements has oxygen reduction capability and water electrolysis overvoltage both lower than those of platinum, and has hydrogen oxidation capability. Since platinum can be dispensed with in the anode-side catalyst composition of the present invention, a low cost fuel cell can be obtained.

Preferably, a metal element of the alloy contained in the anode-side catalyst composition of the present invention is selected from a group consisting of iridium and palladium. These metal elements, iridium and palladium, is preferable since it is highly probable that they have hydrogen oxidation activity. With these metals adopted as a first metal, metal elements that can be alloyed with the first metal can be used as second metal as follows. If the first metal is iridium, a second metal that can be alloyed with iridium is selected from a group consisting of cobalt, molybdenum, niobium, osmium, rhenium, ruthenium, tantalum, titanium, tungsten, vanadium, and zirconium. If the first metal is palladium, a second metal that can be alloyed with palladium is selected from a group consisting of silver, aluminum, gold, cobalt, chromium, copper, iron, indium, manganese, molybdenum, nickel, osmium, lead, rhodium, ruthenium, tin, titanium, uranium, vanadium, tungsten, and zirconium.

An alloy comprising iridium as the first metal and ruthenium as the second metal is particularly preferable since it has the lowest water electrolysis overvoltage and has high hydrogen oxidation capability.

Mass ratio of the first metal to the second metal contained in said alloy is preferably in the range of mass ratio 8:2~1:9. In the case where the first metal is iridium, if the mass ratio of the first metal (iridium) to the second metal is higher than Ir:M=8:2, iridium contained in the catalyst particle may elute and cause various problems. Iridium contained in the catalyst particle may elute due to variation of anode potential in startup/shutdown operation, and the eluted iridium may cause a problem by inducing lowering of proton conductivity of the electrolyte membrane. If the eluted iridium moves to the cathode, it may impede oxygen reduction reaction of the cathode, and may lower the generated electric voltage. On the other hand, if the mass ratio of the first metal (iridium) to the second metal is lower than Ir:M=1:9, the second metal contained in the catalyst particle may elute significantly, and cause similar problems as in the case of eluted iridium. Since iridium has hydrogen oxidation activity, when the proportion of iridium is low, generation efficiency of the fuel cell is lowered (reaction efficiency of the reaction [1] is lowered), and in order to compensate for this performance loss, amount of carried catalyst needs to be increased, and a fuel cell of low cost cannot be obtained. The present inventor has found that elution of the metal contained in the catalyst particle can be substantially reduced by controlling the composition of the alloy catalyst particle, i.e., the mass ratio of the first metal to the second metal within the above-described range.

Catalyst particles are carried by electrically conductive material. A suitable electrically conductive material includes, for example, carbon black, activated carbon, graphite, and the like. A representative material is carbon black particles of high graphitization with BET specific surface area of 50 $m^2/g$ or greater. Preferably, BET specific surface area of the carbon black particles is 300 $m^2/g$ or less. If BET specific surface area of the carbon black particles exceeds 300 $m^2/g$, it becomes possible to carry the catalyst (noble metal) particles on fine particles so that diameter of the catalyst particles becomes fine. This gives rise to problems that the catalyst particles are more likely to be eluted, and that oxygen reduction reaction (ORR) activity of the anode becomes high (leading to lower durability due to startup/shutdown operation). If BET specific surface area of the carbon black particles is 300 $m^2/g$ or less, durability during pole reversal (fuel depletion) is improved since most carbon black particles have small surface area and exhibit high degree of graphitization. If BET specific surface area of the carbon black particles is less than 50 $m^2/g$, surface area is too small to carry catalyst particles uniformly.

Carbon of high degree of graphitization is preferred as a carrier for carrying catalyst particles in view of corrosion resistance during fuel depletion. However, not only carbon but highly durable oxide carrier such as titanium oxide, stannous oxide, etc., can also be used. When an oxide carrier of insufficient electrical conductivity is used, electrically conductive material described above can be preferably used in conjunction to ensure sufficient electrical conductivity.

In order to reduce elution of Ir or the like, it is desirable to reduce impurities in catalyst. As particularly relevant impurities, anions such as chloride ion may be mentioned.

An ion exchange resin included in the catalyst composition acts as material for carrying the catalyst and as a binder for forming the catalyst layer, and also plays a role in forming a passage for ions produced by the catalyst to move. As such ion exchange resin, any known ion exchange resin which has high proton ($H^+$) conductivity, is not electronically conductive and is impermeable to gas may be used with no special limitation. Typical examples include resins having fluorocarbon polymer as backbone and containing sulfonate group, carboxyl group, phosphate group, phosphonic acid group, or the like. These ion exchange resins may be mixed with the catalyst in a solvent, and the resulting solution may be applied to PTFE as reinforcing material to form a catalyst layer.

Ion exchange resin of the present invention is not limited to perfluoro-carbon based polymer compounds, but may be a mixture of hydrocarbon based polymer compound and inorganic polymer compound, or partially fluorocarbon based polymer compound having both C—H bond and C—F bond in the polymer chain. Specific examples of perfluoro-carbon based polymer compound include perfluoro-carbon polymer having sulfonic acid group in side chain, that is, Nafion™ (manufactured by DuPont Co.), Aciplex™ (manufactured by Asahi KASEI Co.), and Flemion™ (manufactured by Asahi Glass Co.). Specific examples of hydrocarbon based polymer compound include polyamide, polyacetal, polyethylene, polypropylene, acrylic resin, polyester, polysulfon, polyether, etc., and derivatives thereof (aliphatic hydrocarbon based polymer electrolyte) having electrolyte group such as sulfonic acid group introduced therein, polystyrene, polyamide having aromatic ring, polyamideimide, polyimide, polyester, polysulfon, polyetherimide, polyether sulfon, polycarbonates etc., and derivatives thereof (partially aromatic hydrocarbon based polymer electrolyte) having electrolyte group such as sulfonic acid group introduced therein, polyether ether ketone, polyether ketone, polyether sulfon, polycarbonate, polyamide, polyamideimide, polyester, polyphenylene sulfide, etc., and derivatives thereof (peraromatic hydrocarbon based polymer electrolyte) having electrolyte group such as sulfonic acid group introduced therein. As inorganic polymer compound, siloxane-based or silane-based, especially alkyl siloxane-based, organic silicon polymer compounds are suitable, and specific examples include polydimethyl siloxane, γ-glycidoxypropyltrimethoxysilane, etc. Specific examples of partially fluorocarbon based polymer compound include polystyrene-graft-ethylene tetrafluoroethylene copolymer, polystyrene-graft-polytetrafluoroethylene, etc., and derivatives thereof having electrolyte group such as sulfonic acid group introduced therein.

The catalyst layer is preferably porous in order for the catalyst to come into good contact with fuel such as hydrogen or the like on the side of the anode and with oxidant gas such as oxygen or air or the like on the side of the cathode. It is generally sufficient that amount of the catalyst contained in the catalyst layer (in terms of equivalent mass of metal element) is in the range of 0.001~5 $mg/cm^2$. In particular, amount of catalyst carried on the anode is advantageously in the range of 0.001~0.2 $mg/cm^2$. Since it is desirable in view of cost and durability during startup/shutdown operation that amount of catalyst carried on the anode is small, it is preferably 0.2 $mg/cm^2$ or less. When the amount of catalyst carried on the anode is too small, performance of electricity generation may be lowered. Therefore, it is preferably 0.001 $mg/cm^2$ or more. Taking balance of these factors into account, the amount of catalyst carried on the anode may be about 0.05 $mg/cm^2$. The amount of catalyst carried on the cathode is advantageously in the range of 0.05~0.6 $mg/cm^2$. The more the amount of catalyst carried on the cathode, the higher are both initial activity and durability. In view of cost, however, it is preferably 0.6 $mg/cm^2$ or less. If the amount of catalyst carried on the cathode is too small, initial activity and durability are substantially lowered. Therefore, it is preferably 0.05 $mg/cm^2$ or more. It is generally sufficient that thickness of the catalyst layer is in the range of 0.5~200 μm. For anode in particular, it is preferably in the range of 1~100 μm, and for cathode, it is preferably in the range of 1~30 μm.

The catalyst layer of the cathode of a fuel cell is not particularly limited, and any conventionally known catalyst layer can be used as long as it contains catalyst particles and ion exchange resin. A catalyst is usually composed of electrically conductive material that carries catalyst particles. Any catalyst particles exhibiting catalytic activity to hydrogen oxidation reaction or oxygen reduction reaction can be used. In addition to platinum (Pt) or other noble metals, iron, chromium, nickel, cobalt, etc., and alloys thereof can be used. By using the anode-side catalyst composition of the present invention, deterioration of cathode can be reduced, and elution of cathode catalyst caused by the deterioration of cathode is also reduced. Therefore, the cathode catalyst needs not be carried in excess, leading to cost reduction.

A polymer electrolyte membrane having an anode catalyst layer joined to one surface and a cathode catalyst layer joined to the other surface to form an integral unit is generally called as a membrane electrode assembly (MEA). The present invention relates to a membrane electrode assembly (MEA) for polymer electrolyte type fuel cell, with anode catalyst layer comprising the catalyst composition as described above. This MEA has the feature based on the above-described catalyst composition included in the anode catalyst layer, i.e., it has the advantages of preventing deterioration of the anode caused by depletion of hydrogen, reducing deterioration of the anode and the cathode at the time of startup/shutdown operation of a fuel cell, having excellent tolerance to CO poisoning, and being of low cost.

The ion exchange resin described above can be used as material for the polymer electrolyte membrane. Since thickness of the polymer electrolyte membrane has influence on electric resistance, it should be as thin as possible provided that electronic insulation and gas impermeability is not impaired. Specifically, the thickness is set within the range of 0.1~100 μm, preferably 1~30 μm.

In general, an MEA can be further provided with gas diffusion layers on the anode catalyst layer and/or the cathode catalyst layer on the side opposite to the polymer electrolyte membrane. The gas diffusion layer is a sheet-like material having electrical conductivity and air permeability. Typical examples include electrically conductive and air permeable substrate such as carbon paper, non-woven carbon fabric, woven carbon fabric, carbon felt, etc., subjected to water repellent finishing. Porous sheet obtained from carbon based particles and fluoro-carbon based resin can also be used. For example, porous sheet formed from carbon black with polytetrafluoroethylene as binder can be used.

In the MEA of the present invention, amount of Pt carried on the cathode may be 0.2 $mg/cm^2$ or less. In view of durability, it has been conventionally required that amount of Pt carried on the cathode be 0.4 $mg/cm^2$ or more. By using the anode-side catalyst composition of the present invention, deterioration of the cathodes can be reduced, so that, even if amount of Pt carried on the cathode is 0.2 $mg/cm^2$ or less, the MEA can be practically used.

EXAMPLES

The present invention will be more specifically described below with reference to Examples, but it is to be understood that the present invention is not limited to these Examples.

[Fabrication of Catalyst]

In order to evaluate cell, catalysts with iridium, ruthenium, or iridium-ruthenium carried on carbon black were prepared. Fabrication procedure of catalysts used for cell evaluation will be described in detail below.

(Fabrication of Iridium-Ruthenium Alloy Catalyst)

First, a solution was prepared by dissolving iridium nitrate solution containing 0.6 g of Ir in 200 ml of ethanol. On the other hand, a dispersion was prepared by well dispersing 1.4 g of carbon black (Trade name: KetjenBlack EC, manufactured by KetjenBlack International Co.) in 300 mL of ethanol. Then, slurry was prepared by adding iridium nitrate solution to the carbon black dispersion while stirring. After irradiating the slurry with ultrasonic waves for ten minutes, iridium nitrate was impregnated to carbon black while stirring at 80° C., and was dried and hardened while stirring at the same temperature for about ten hours, and black powder was obtained. The obtained powder was pulverized in agate mortar, and was subjected to heat treatment at 600° C. for two hours under flowing mixed gas of 10% hydrogen gas and 90% nitrogen gas to prepare iridium catalyst carried on carbon. This iridium catalyst carried on carbon was dispersed in 300 ml of ethanol to prepare dispersion. On the other hand, ruthenium nitrate solution containing Ru so as to obtain prescribed molar ratio was dissolved in 200 mL of ethanol to prepare ruthenium nitrate solution. Then, ruthenium nitrate solution was added to dispersion of iridium catalyst carried on carbon while being stirred to prepare slurry. After the slurry was irradiated with ultrasonic waves for ten minutes, the precursor was impregnated to carbon black while being stirred at 60° C., and dried and hardened while stirring at 70° C. for about ten hours to thereby obtain black powder. The obtained powder was pulverized in an agate mortar, and was subjected to heat treatment at 600° C. for two hours under flowing mixed gas of 10% hydrogen gas and 90% nitrogen gas to prepare iridium-ruthenium catalyst carried on carbon (catalyst A1~A5).

(Fabrication of Iridium-Ruthenium Alloy Catalyst Carried on Graphitized Carbon Black)

Catalyst B1 was prepared in the same manner as in catalyst A1~A5 except that graphitized KetienBlack was used to carry the catalyst. The graphitized carbon black used to carry the catalyst was prepared by processing the carbon black (Trade name: KetienBlack EC, manufactured by KetienBlack International, Co.) at 2500° C. to graphitize it.

(Fabrication of Iridium Catalyst)

First, a solution was prepared by dissolving iridium nitrate solution containing 0.6 g of Ir in 200 ml of ethanol. On the other hand, a dispersion was prepared by well dispersing 1.4 g of carbon black (Trade name: KetjenBlack EC, manufactured by KetjenBlack International Co.) in 300 mL of ethanol. Then, slurry was prepared by adding iridium nitrate solution to the carbon black dispersion while stirring. After irradiating the slurry with ultrasonic waves for ten minutes, iridium nitrate was impregnated to carbon black while stirring at 80° C., and was dried and hardened while stirring at the same temperature for about ten hours, and black powder was obtained. The obtained powder was pulverized in agate mortar, and was subjected to heat treatment at 600° C. for two hours under flowing mixed gas of 10% hydrogen gas and 90% nitrogen gas to prepare iridium catalyst (catalyst R2) carried on carbon carrier.

(Fabrication of Ruthenium Catalyst)

First, precursor solution was prepared by dissolving ruthenium nitrate solution containing 0.6 g of Ru in 200 ml of ethanol. On the other hand, a dispersion was prepared by well dispersing 1.4 g of carbon black (Trade name: KetjenBlack EC, manufactured by KetjenBlack International Co.) in 300 mL of ethanol. Then, slurry was prepared by adding ruthenium nitrate solution to the carbon black dispersion while stirring. After irradiating the slurry with ultrasonic wave for ten minutes, ruthenium nitrate was impregnated to carbon black while stirring at 60° C., and was dried and hardened while stirring at 70° C. for about ten hours, and black powder was obtained. The obtained powder was pulverized in agate mortar, and was subjected to heat treatment at 600° C. for two hours under flowing mixed gas of 10% hydrogen gas and 90% nitrogen gas to prepare ruthenium catalyst (catalyst R3) carried on carbon carrier.

TABLE 1

Detail of catalyst fabrication

| Catalyst name | Catalyst metal ratio | Carbon carrier | Catalyst carrier ratio |
|---|---|---|---|
| Catalyst A1 | Ir:Ru = 8:2 (atom %) | KB | 32.7 wt % |
| Catalyst A2 | Ir:Ru = 7:3 (atom %) | KB | 34.4 wt % |
| Catalyst A3 | Ir:Ru = 6:4 (atom %) | KB | 36.7 wt % |
| Catalyst A4 | Ir:Ru = 4:6 (atom %) | KB | 43.4 wt % |
| Catalyst A5 | Ir:Ru = 1:9 (atom %) | KB | 71.1 wt % |
| Catalyst B1 | Ir:Ru = 6:4 (atom %) | Graphitized carbon | 36.7 wt % |
| Catalyst R2 | Ir | KB | 30 wt % |
| Catalyst R3 | Ru | KB | 30 wt % |

[Fabrication of Membrane Electrode Assembly (MEA)]

Catalysts obtained as described above and catalysts for comparison were used to fabricate membrane electrode assembly (MEA) for evaluation of cells. Details of fabrication procedure for fabricating membrane electrode assembly are shown below.

(Anode)

Different anode catalyst carried on carbon was adopted for each Comparative example and each Inventive example. In Comparative example 1, 2, 50% platinum carried on carbon TEC10E50E (catalyst P: manufactured by TANAKA KIKINZOKU KOGYO K.K.) carried on KetjenBlack was adopted. In Comparative example 3, 40% iridium carried on carbon HP Iridium on VulcanXC72 (catalyst R1: BASF Fuel Cell, Inc.) carried on Vulcan XC72 was adopted. In Comparative example 4, 5, above-described catalysts R2, R3 were adopted. In Inventive examples 1~6, the above-described catalysts A1~A5 and B1 were adopted.

Each catalyst carried on carbon was mixed with alcohol so as to obtain solid content of 9 wt %. Then, each mixed solution was added to ion exchange resin solution (perfluorosulfonic acid electrolyte solution (SE20142): manufactured by DuPont Co.) so as to obtain mass ratio of ion exchange resin solution to the carbon carrier of 1.0. The solution prepared in this manner was irradiated with ultrasonic wave to disperse the catalyst-carrying carbon, and coating solution was thus obtained.

Obtained coating solution was applied to PTFE sheet of 200 µl in thickness to obtain prescribed noble metal carrier loading as shown in Table 2 and dried to form an anode electrode layer.

Table 2 shows anode name, type of anode catalyst, catalyst metal loading for each of the Comparative examples and Inventive examples.

(Cathode)

In every Comparative example and Inventive example, PRIMEA™ #5580 (Pt loading 0.4 mg/cm$^2$: manufactured Japan GORE-TEX Co.) was adopted for cathode.

(Membrane Electrode Assembly)

In every Comparative example and Inventive example, GORE-SELECT™

20K (manufactured by Japan GORE-TEX, Co.) was adopted as the electrolyte membrane. The electrolyte membrane of 15×15 cm in size and 201 am in thickness was used. Membrane electrode assembly (MEA) was formed from the above-described anode, cathode and electrolyte membrane by hot pressing and using decal method.

TABLE 2

Details of MEA

| Experimental sample | Anode | Anode catalyst | Metal loading/ mg/cm$^2$ |
|---|---|---|---|
| Comparative example 1 | Electrode P1 | Catalyst P (commercial Pt carrier KB) | 0.10 |
| Comparative example 2 | Electrode P2 | Catalyst P (commercial Pt carrier KB) | 0.05 |
| Comparative example 3 | Electrode R1 | Catalyst R1 (commercial Ir carrier KB) | 0.05 |
| Comparative example 4 | Electrode R2 | Catalyst R2 (Ir carrier KB) | 0.05 |
| Comparative example 5 | Electrode R3 | Catalyst R3 (Ru carrier KB) | 0.05 |
| Inventive example 1 | Electrode A1 | Catalyst A1 (Ir:Ru = 8:2 carrier KB) | 0.05 |
| Inventive example 2 | Electrode A2 | Catalyst A2 (Ir:Ru = 7:3 carrier KB) | 0.05 |
| Inventive example 3 | Electrode A3 | Catalyst A3 (Ir:Ru = 6:4 carrier KB) | 0.05 |
| Inventive example 4 | Electrode A4 | Catalyst A4 (Ir:Ru = 4:6 carrier KB) | 0.05 |

TABLE 2-continued

Details of MEA

| Experimental sample | Anode | Anode catalyst | Metal loading/ mg/cm$^2$ |
|---|---|---|---|
| Inventive example 5 | Electrode A5 | Catalyst A5 (Ir:Ru = 1:9 carrier KB) | 0.05 |
| Inventive example 6 | Electrode B1 | Catalyst B1 (Ir:Ru = 6:4 carrier graphitized KB) | 0.05 |

[Initial Cell Characteristics Evaluation Test]

Each membrane electrode assembly was disposed between two water-repellent carbon papers (CARBEL™ CNW10A: manufactured by Japan GORE-TEX, Co.) as gas diffusion layers, and was incorporated in an electricity generating cell. Initial generation test was implemented by supplying hydrogen (utilization factor 80%) to anode and air (utilization factor 40%) to cathode at ordinary pressure, and with current density of 0.2 A/cm$^2$, 0.5 A/cm$^2$, and 1.0 A/cm$^2$ at cell temperature of 80° C. Gas with its dew point 80° C. was supplied both to the anode and the cathode. Voltage value thus obtained is shown in Table 3. From these result, it was confirmed that a fuel cell using the anode-side catalyst composition of the present invention can be applied in practice.

TABLE 3

Initial voltage characteristics

| Experimental sample | 0.2 A/cm$^2$ | 0.5 A/cm$^2$ | 1.0 A/cm$^2$ |
|---|---|---|---|
| Comparative example 1 | 0.782 V | 0.719 V | 0.614 V |
| Comparative example 2 | 0.780 V | 0.716 V | 0.613 V |
| Comparative example 3 | 0.778 V | 0.713 V | 0.602 V |
| Comparative example 4 | 0.783 V | 0.719 V | 0.609 V |
| Comparative example 5 | 0.756 V | 0.663 V | Cannot generate |
| Inventive example 1 | 0.777 V | 0.719 V | 0.630 V |
| Inventive example 2 | 0.777 V | 0.719 V | 0.631 V |
| Inventive example 3 | 0.777 V | 0.720 V | 0.638 V |
| Inventive example 4 | 0.779 V | 0.720 V | 0.625 V |
| Inventive example 5 | 0.768 V | 0.706 V | 0.609 V |
| Inventive example 6 | 0.778 V | 0.720 V | 0.633 V |

[Initial Cell Characteristics Evaluation Test in Mixing CO]

Each membrane electrode assembly was disposed between the two water-repellent carbon papers (CARBEL™ CNW10A: manufactured by Japan GORE-TEX, Co.) as gas diffusion layers, and was incorporated in an electricity generating cell. Initial generation test was implemented by supplying hydrogen (utilization factor 60%) or hydrogen mixed with 100 ppm CO (utilization factor 60%) to anode and air (utilization factor 40%) to cathode at ordinary pressure, and with current density of 0.1 A/cm$^2$ at cell temperature of 70° C. Gas with its dew point 70° C. was supplied both to the anode and the cathode. With hydrogen mixed with 100 ppm CO, the voltage characteristics is lowered as compared to pure hydrogen due to poisoning of anode catalyst by CO. Difference of voltage value obtained by using hydrogen mixed with 100 ppm CO as fuel and voltage value obtained by using pure hydrogen as fuel at current density of 0.1 A/cm$^2$ is shown in Table 4. From these results, it was confirmed that, even if fuel containing Co as impurity is used, a fuel cell using the anode-side catalyst composition of the present invention can be applied in practice.

TABLE 4

Difference of voltage for fuel mixed with 100 ppm CO

| Experimental sample | 0.1 A/cm$^2$ |
|---|---|
| Comparative example 1 | 394 mV |
| Comparative example 4 | 387 mV |
| Inventive example 1 | 288 mV |
| Inventive example 2 | 281 mV |
| Inventive example 3 | 271 mV |
| Inventive example 4 | 261 mV |
| Inventive example 6 | 275 mV |

From the results of Table 4, it was found that, in the Inventive example, difference value is smaller than in the Comparative example. The difference value indicates lowering of the voltage characteristics. Thus, it was shown that, when CO is mixed into hydrogen, lowering (difference) of voltage characteristics is large in the Comparative examples, and lowering (difference) of voltage characteristics is small in the Inventive examples.

[Evaluation Test for Evaluating Anode Oxygen Reduction Characteristics]

Each membrane electrode assembly was disposed between the two water-repellent carbon papers (CARBEL™ CNW10A: manufactured by Japan GORE-TEX, Co.) as gas diffusion layers, and was incorporated in an electricity generating cell. Initial generation test was implemented by supplying hydrogen (utilization factor 80%) to anode and air (utilization factor 40%) to cathode at ordinary pressure, and with current density of 0.1 A/cm$^2$ at cell temperature of 80° C. Gas with its dew point 80° C. was supplied both to the anode and the cathode. Voltage value obtained after resistance correction is shown in Table 5. From this result, it was found that non-platinum based catalysts (Inventive examples 1~6, Comparative examples 3~5) have oxygen reduction capability as platinum based catalysts (Comparative examples 1, 2), but that value of the obtained voltage is lower than that for platinum based catalysts. That is, non-platinum based catalysts have lower oxygen reduction capability than platinum, and can thereby suppress decay at the time of startup/shutdown operation.

TABLE 5

Anode oxygen reduction characteristics evaluation voltage (iR correction) characteristics

| Experimental sample | 0.1 A/cm$^2$ |
|---|---|
| Comparative example 1 | 0.811 V |
| Comparative example 2 | 0.762 V |
| Comparative example 3 | 0.566 V |
| Comparative example 4 | 0.550 V |
| Comparative example 5 | 0.502 V |
| Inventive example 1 | 0.708 V |
| Inventive example 2 | 0.708 V |
| Inventive example 3 | 0.695 V |
| Inventive example 4 | 0.688 V |
| Inventive example 5 | 0.484 V |
| Inventive example 6 | 0.592 V |

[Evaluation Test for Evaluating Cell Durability Characteristics Under the Condition of Startup/Shutdown Operation]

Each membrane electrode assembly was disposed between the two water-repellent carbon papers (CARBEL™ CNW10A: manufactured by Japan GORE-TEX, Co.) as gas diffusion layers, and was incorporated in an electricity generating cell. Generation test during shutdown of startup operation was implemented by supplying hydrogen (utilization factor 83%) to anode and air (utilization factor 50%) to cathode at ordinary pressure at cell temperature of 80° C. Gas with its dew point 70° C. was supplied both to the anode and the cathode. Evaluation procedure for startup/shutdown operation will be described below. First, ordinary initial generation characteristics evaluation is carried out with current density of 0.3 A/cm$^2$, 0.8 A/cm$^2$, 1.4 A/cm$^2$ to obtain initial generation voltage, and then, after air is supplied to the anode for forced shutdown of generation, hydrogen is supplied again to generate electricity (startup). This startup/shutdown cycle was implemented 1000 times as acceleration test to simulate startup/shutdown operation. Thereafter, ordinary generation characteristics evaluation was carried out with current density of 0.3 A/cm$^2$, 0.8 A/cm$^2$, 1.4 A/cm$^2$ to obtain generation voltage after the test. Voltage deterioration rate was determined from the difference of voltage after test and the initial voltage. The obtained result is shown in Table 6. From these results, it was confirmed that the fuel cell using the anode-side catalyst composition of the present invention can generate electricity even after 1000 times of startup/shutdown cycle, and exhibits high durability.

TABLE 6

Voltage deterioration rate characteristics after startup/shutdown test

| Experimental sample | 0.3 A/cm$^2$ | 0.8 A/cm$^2$ | 1.4 A/cm$^2$ |
|---|---|---|---|
| Comparative example 1 | 343 μV/cycle | cannot generate after test | cannot generate after test |
| Comparative example 2 | 146 μV/cycle | cannot generate after test | cannot generate after test |
| Comparative example 3 | 44 μV/cycle | 85 μV/cycle | 303 μV/cycle |
| Comparative example 4 | 29 μV/cycle | 48 μV/cycle | 159 μV/cycle |
| Inventive example 1 | 22 μV/cycle | 29 μV/cycle | 68 μV/cycle |
| Inventive example 2 | 27 μV/cycle | 38 μV/cycle | 92 μV/cycle |
| Inventive example 3 | 25 μV/cycle | 36 μV/cycle | 78 μV/cycle |
| Inventive example 4 | 27 μV/cycle | 44 μV/cycle | 131 μV/cycle |
| Inventive example 5 | 19 μV/cycle | 32 μV/cycle | 108 μV/cycle |
| Inventive example 6 | 27 μV/cycle | 46 μV/cycle | 134 μV/cycle |

Also, in order to check elution of noble metal in the anode during startup/shutdown test, following electrochemical evaluation was carried out. Hydrogen gas with its dew point 80° C. was supplied to the anode, and nitrogen gas with dew point of 80° C. was supplied to the cathode. After voltage was stabilized, cyclic voltammetry was carried out using a potentiostat with the cathode as working electrode, 1.2 V as upper-bound potential, 0.05 V as lower-bound potential and with scan speed of 100 mV/s. Double layer capacity of the cathode was estimated from the current value at 0.40 V at the third cycle. This evaluation was performed before and after the startup/shutdown test. If noble metal was eluted, the double layer capacity of the cathode would increase. Therefore, degree of noble metal elution was evaluated from the magnitude of the increase. Degree of noble metal elution evaluated from the change of the double layer capacity before and after the startup/shutdown test is shown in Table 7. In Comparative example 3, the rate of change is 102%, which suggests large elution. In the alloy catalysts (Inventive examples 1~6), the rate of change is 17%~14%, which suggests substantial improvement of noble metal elution.

Since, as compared to iridium catalyst (Comparative example 3, Comparative example 4), iridium-ruthenium alloy (Inventive examples 1~6) shows large improvement of elution, solid solution of iridium and ruthenium appears to have greatly improved elution tolerance.

TABLE 7

Change of capacity of cathode double layer before and after startup/shutdown test

| Experimental sample | Before test | After test | change |
|---|---|---|---|
| Comparative example 1 | 59.2 mF/cm$^2$ | 39.4 mF/cm$^2$ | −33% |
| Comparative example 2 | 57.2 mF/cm$^2$ | 41.7 mF/cm$^2$ | −27% |
| Comparative example 3 | 59.8 mF/cm$^2$ | 120.9 mF/cm$^2$ | 102% |
| Comparative example 4 | 56.9 mF/cm$^2$ | 68.5 mF/cm$^2$ | 20% |
| Inventive example 1 | 60.5 mF/cm$^2$ | 70.6 mF/cm$^2$ | 17% |
| Inventive example 2 | 59.4 mF/cm$^2$ | 63.6 mF/cm$^2$ | 7% |
| Inventive example 3 | 61.7 mF/cm$^2$ | 60.8 mF/cm$^2$ | −1% |
| Inventive example 4 | 58.3 mF/cm$^2$ | 50.3 mF/cm$^2$ | −14% |
| Inventive example 5 | 58.0 mF/cm$^2$ | 51.6 mF/cm$^2$ | −11% |
| Inventive example 6 | 58.1 mF/cm$^2$ | 50.9 mF/cm$^2$ | −12% |

Further, SEM-EDX analysis {S-3400N (manufactured by Hitachi High-Technologies, Co.), GENESIS (manufactured by EDAX, Co.)} of the cross section of catalyst layer was carried out in order to confirm elution of noble metal in the anode during the startup/shutdown test. Samples having cross section of MEA exposed by freeze fracturing of MEA were prepared, and Ir (M) detected on the cathode side was examined.

TABLE 8

Ir in the cathode after startup/shutdown test

| Experimental Sample | Ir (M)/Pt (M), % |
|---|---|
| Comparative Example 3 | 24 |
| Comparative Example 4 | 11 |
| Inventive Example 1 | Trace |
| Inventive Example 3 | Not detected |
| Inventive Example 5 | Trace |
| Inventive Example 6 | Trace |

In Comparative examples, iridium was detected in the cathode after the startup/shutdown test. In the present invention (Inventive examples), iridium in the cathode was trace, or was not detected. Thus, in the present invention, excellent tolerance to iridium elution was obtained. The term "trace" means that data showed a small amount of iridium but this data cannot be considered significant in view of S/N ratio. The term "not detected" means that iridium was not detected.

[Evaluation Test for Evaluating Cell Durability Characteristics Under Hydrogen Depleting Condition (Pole Reversal)]

Each membrane electrode assembly was disposed between two water-repellent carbon papers (CARBEL™ CNW10A: manufactured by Japan GORE-TEX, Co.) as gas diffusion layers, and was incorporated in an electricity generating cell. Initial generation test was implemented by supplying hydrogen (utilization factor 67%) to anode and air (utilization factor 50%) to cathode at ordinary pressure with dew point of gas of 70° C. for both anode and cathode. Generation test was carried out with current density of 0.2 A/cm$^2$, 0.5 A/cm$^2$, and 1.0 A/cm$^2$ and at cell temperature of 70° C. to obtain initial generation voltage. For evaluating cell characteristics under hydrogen depleting condition, after the generation test, nitrogen gas was supplied to the anode side to replace the anode gas from hydrogen to nitrogen. In this state, an acceleration test simulating the hydrogen depleting operation (pole reversal) was carried out as cyclic operation of 90 cycles with 5 seconds of current application to the anode at current density of 0.2 A/cm$^2$/5 seconds of open circuit operation as one cycle. Thereafter, ordinary evaluation of generation characteristics was performed to obtain generation voltage at current density of 0.2 A/cm$^2$ after the acceleration test. Voltage deterioration rate was obtained from the difference of generation voltage after the acceleration test and the initial generation voltage. Results are shown in Table 9. From these results, it was confirmed that a fuel cell using the anode-side catalyst composition according to the present invention can generate electricity after the 90 cycles of simulated hydrogen depleting operation (pole reversal). Further, in the Inventive example 6, 180 cycles of simulated hydrogen depleting operation was also examined.

TABLE 9

Voltage deterioration rate characteristics after hydrogen depleting operation (pole reversal) test

| Experimental sample | 0.2 A/cm$^2$ | 0.5 A/cm$^2$ |
|---|---|---|
| Comparative Example 1 | Cannot generate after test | Cannot generate after test |
| Comparative Example 2 | Cannot generate after test | Cannot generate after test |
| Comparative Example 3 | 83 μV/cycle | 73 μV/cycle |
| Comparative Example 4 | 143 μV/cycle | 258 μV/cycle |
| Inventive Example 1 | 314 μV/cycle | 556 μV/cycle |
| Inventive Example 2 | 166 μV/cycle | 293 μV/cycle |
| Inventive Example 3 | 125 μV/cycle | 200 μV/cycle |
| Inventive Example 4 | 300 μV/cycle | 508 μV/cycle |
| Inventive Example 5 | 81 μV/cycle | 185 μV/cycle |
| Inventive Example 6 | 21 μV/cycle | 0 μV/cycle |

Further, as an index for judging the water electrolysis overvoltage of the anode, cell voltage was measured at each cycle (1, 30, 90 cycle) of the hydrogen depletion test. For Inventive example 6, cell voltage was also measured at the 180 cycle. Results are shown in Table 10. In Comparative example 1 and 2 in which platinum-based catalyst was used on the anode, the cell voltage changed substantially. The cell voltage showed little change when the alloy catalyst according to the present invention was used. It is surmised that this is due to the water electrolysis overvoltage of the alloy catalyst that is lower than that of platinum, resulting in suppression of carbon corrosion of the fuel electrode. It was also confirmed that higher tolerance to hydrogen depletion (pole reversal) can be obtained by using graphitized carbon black.

TABLE 10

Voltage characteristics during hydrogen depletion (pole reversal) test

| Experimental sample | 1 cycle (after 5 seconds) | 30 cycle | 90 cycle | 180 cycle |
|---|---|---|---|---|
| Comparative Example 1 | −0.99 V | −24 V | −25 V | — |
| Comparative Example 2 | −0.99 V | −24 V | −25 V | |
| Comparative Example 3 | −0.71 V | −0.74 V | −0.77 V | |
| Comparative Example 4 | −0.72 V | −0.73 V | −1.68 V | |
| Inventive Example 1 | −0.67 V | −0.72 V | −1.75 V | |
| Inventive Example 2 | −0.64 V | −0.69 V | −0.79 V | |
| Inventive Example 3 | −0.65 V | −0.71 V | −0.78 V | |
| Inventive Example 4 | −0.64 V | −0.70 V | −0.85 V | |
| Inventive Example 5 | −0.65 V | −0.70 V | −0.74 V | |
| Inventive Example 6 | −0.66 V | −0.71 V | −0.73 V | −0.74 V |

What is claimed is:

1. A membrane electrode assembly (MEA) for a solid polymer electrolyte fuel cell comprising:
   a polymer electrolyte membrane,
   an anode catalyst layer joined to one surface of the polymer electrolyte membrane, and
   a cathode catalyst layer joined to an opposite surface of the polymer electrolyte membrane,
   wherein the anode catalyst layer comprises a catalyst and an ion exchange resin, the catalyst having catalyst particles carried on electrically conductive carbon material, characterized in that the catalyst particles are formed of an alloy, of which oxygen reduction capability and water electrolysis overvoltage are both lower than those of platinum and which has hydrogen oxidizing capability, wherein said alloy comprises iridium as a first metal and ruthenium as a second metal, the mass ratio of the first metal to the second metal in said ruthenium and iridium alloy is in the range of 8:2-1:9, and said ruthenium and iridium alloy is contained in the anode catalyst layer in an amount of not more than about 0.2 mg/cm$^2$; and
   wherein the cathode catalyst layer comprises platinum in an amount not more than 0.2 mg/cm$^2$.

2. The membrane electrode assembly (MEA) as claimed in claim 1, wherein said electrically conductive material is carbon black of high graphitization degree having BET specific surface area of not smaller than 50 m$^2$/g and not larger than 300 m$^2$/g.

3. The membrane electrode assembly (MEA) as claimed in claim 1, said ruthenium and iridium alloy is contained in the anode-side catalyst composition in an amount of about 0.05 mg/cm2.

* * * * *